H. JANDER.
APPARATUS FOR THE FRACTIONAL DISTILLATION OF SULFURIC ACID AND OTHER LIQUIDS.
APPLICATION FILED MAR. 8, 1919.

1,321,210.

Patented Nov. 11, 1919.
4 SHEETS—SHEET 1.

Inventor
Henry Jander
by Maurice Bloch
attorney

H. JANDER.
APPARATUS FOR THE FRACTIONAL DISTILLATION OF SULFURIC ACID AND OTHER LIQUIDS.
APPLICATION FILED MAR. 8, 1919.
1,321,210.
Patented Nov. 11, 1919.
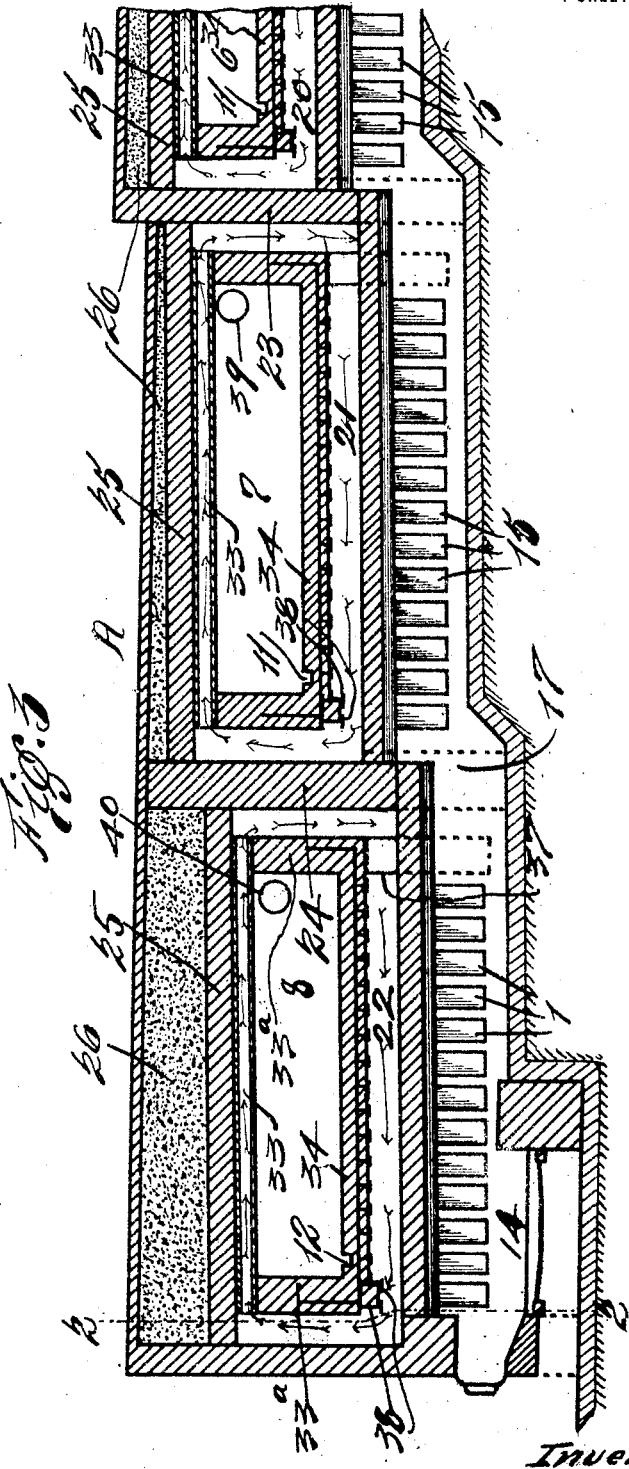

H. JANDER.
APPARATUS FOR THE FRACTIONAL DISTILLATION OF SULFURIC ACID AND OTHER LIQUIDS.
APPLICATION FILED MAR. 8, 1919.
1,321,210.
Patented Nov. 11, 1919.
4 SHEETS—SHEET 3.
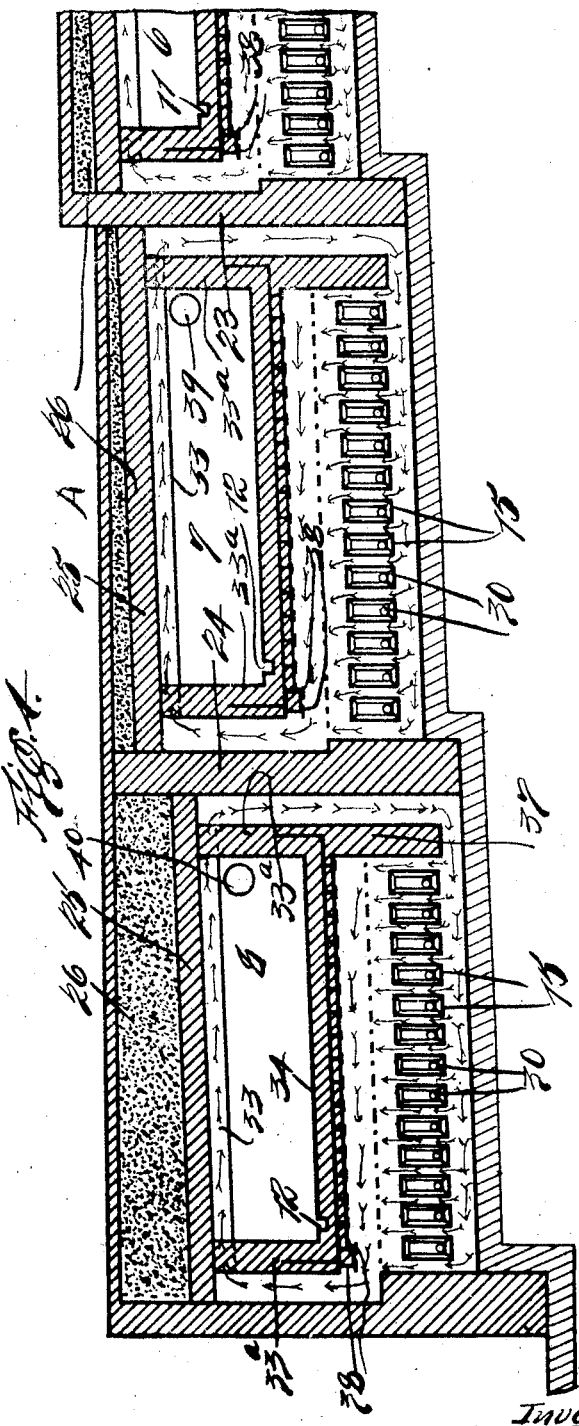
Inventor
Henry Jander,
attorney.

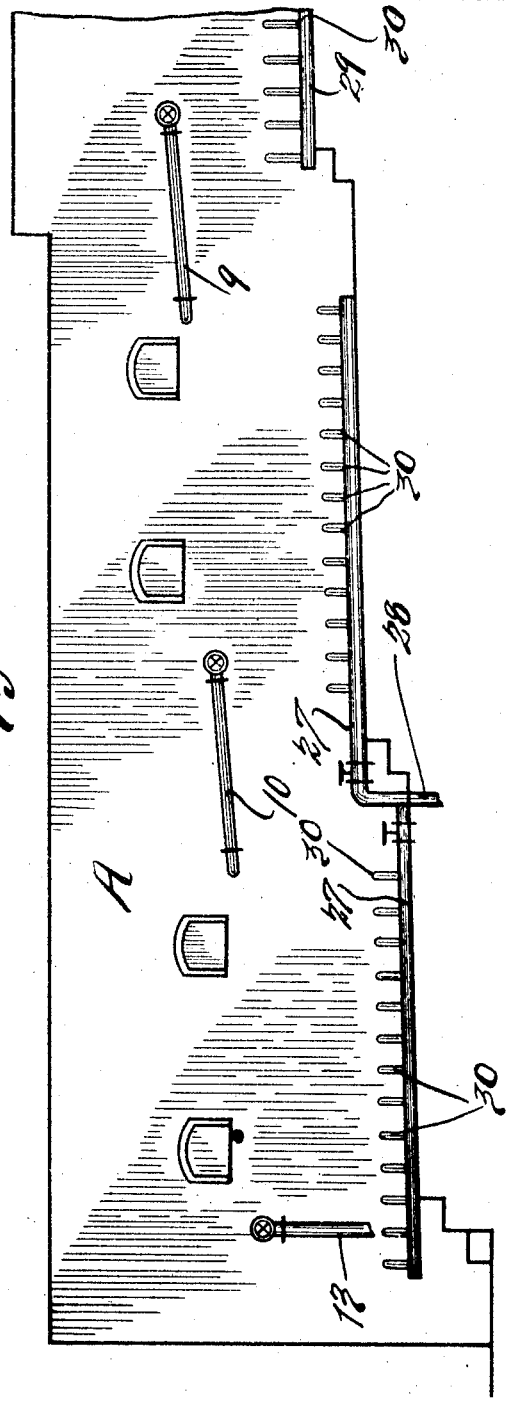

UNITED STATES PATENT OFFICE.

HENRY JANDER, OF BROOKLYN, NEW YORK.

APPARATUS FOR THE FRACTIONAL DISTILLATION OF SULFURIC ACID AND OTHER LIQUIDS.

1,321,210.  Specification of Letters Patent.  Patented Nov. 11, 1919.

Application filed March 8, 1919. Serial No. 281,427.

*To all whom it may concern:*

Be it known that I, HENRY JANDER, a citizen of the United States of America, residing at Brooklyn, Kings county, State of New York, have invented certain new and useful Improvements in Apparatus for the Fractional Distillation of Sulfuric Acid and other Liquids, of which the following is a full, clear, and exact description.

This invention relates to improvements in apparatus for distilling sulfuric acid, one of the chief objects of my invention being to provide an apparatus arranged for the distillation of sulfuric acid without the formation of crystals usually produced by allowing the fumes of the distillate to mingle with the gases of combustion. To accomplish this result, I have arranged an apparatus to distil the above named acid by indirect heat, that is to say, by air heated by induction through the employment of suitable radiators which are subjected to the action of a fire or other heat producing agency. To carry my invention into practice, a relatively inexpensive apparatus may be employed, that is to say, an apparatus formed out of fire-brick, cement, etc., instead of metallic retorts which are expensive and which are usually employed. The above is an outline of the objects of my invention. A more detailed account will be hereinafter presented in connection with the accompanying drawings, wherein:—

Fig. 2 is a cross sectional view, the section being taken on a line 2—2 in Fig. 3;

Fig. 3 is a longitudinal sectional view, the section being taken on a line 3—3 in Fig. 2;

Fig. 4 is a similar view, the section being taken on a line 4—4 in Fig. 2; and

Fig. 5 is a side elevation of my improved distilling apparatus.

Figure 1:
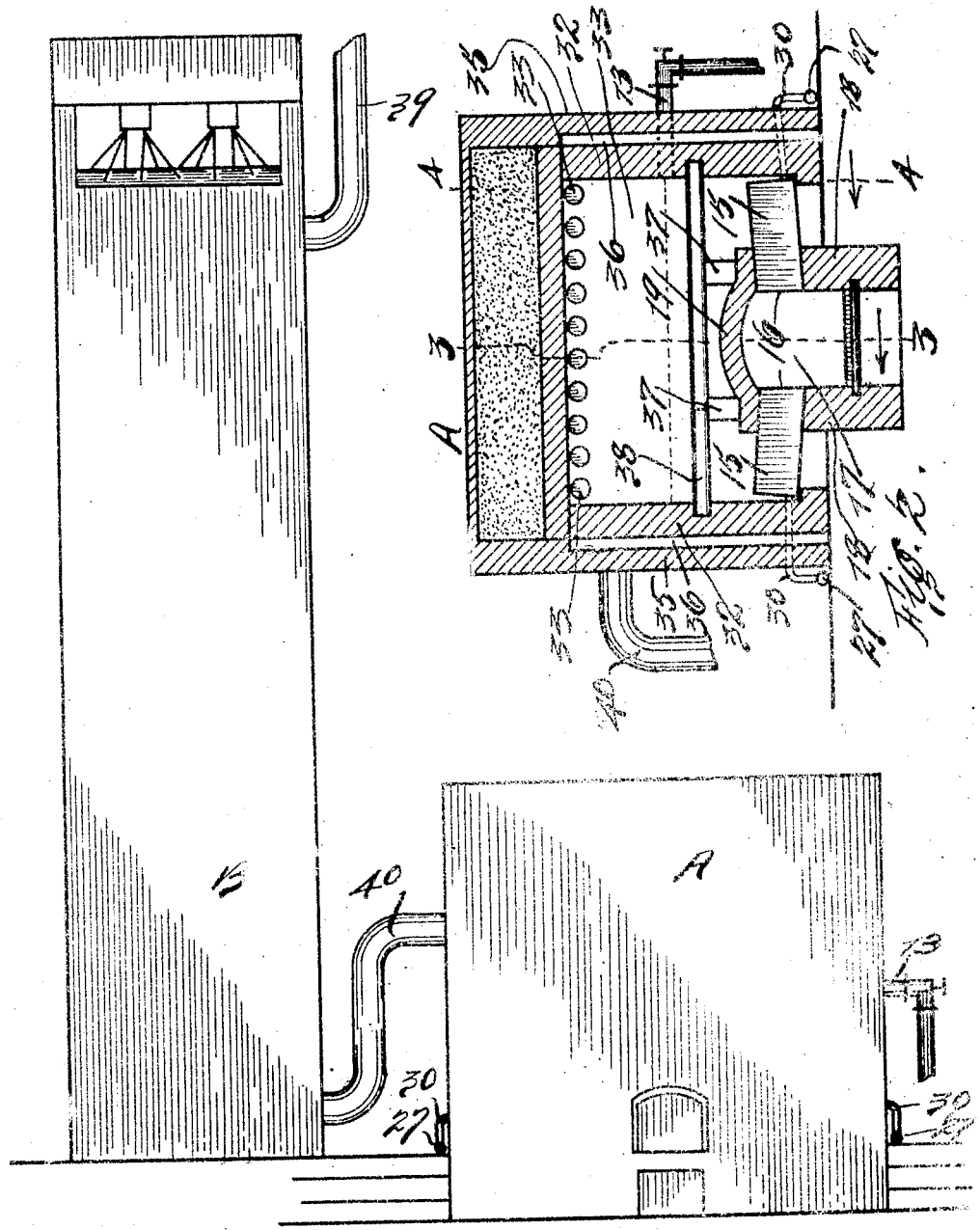
Figure 1 is a diagrammatic end view of an embodiment of my invention, a concentrating tower being also indicated.

As herein arranged, my improved distilling apparatus consists of three pans or distilling chambers 6, 7 and 8, which have no communication one with the other, except by means of drain pipes 9 and 10 (see Fig. 5), by which means the unevaporated matter is conducted firstly from pan or chamber 6 to chamber 7 and from chamber 7 to chamber 8. Each pan 6 and 7 is provided with a gutter 11 and the pan 8 with a gutter 12. The drain-pipe 9 conducts undistilled liquid matter from gutter 11 in pan 6 to pan 7, and pipe 10 conducts undistilled liquid matter from gutter 11 in pan 7 to pan 8. The gutter 12 in pan 8 has in communication therewith a drain pipe 13 through which the heavier undistilled liquid matter is drawn off. This product is of a low grade and is usually used for fertilization purposes. The pans 6, 7 and 8 are heated to cause evaporization by indirect heat or in other words, by air heated by radiators which are directly exposed to the hot gases from a fire in fire-box 14 (Fig. 3). The radiators are herein indicated by 15, and consist (in this instance) of hollow boxes open at one end 16. (See Fig. 2). The open ends of the radiators or boxes are directed toward a central flue or passage 17 leading from the fire-box 14 to a chimney, not shown. The flue 17 is virtually a tunnel having side walls 18 and top 19, set partly within chambers 20, 21 and 22, said chambers containing the pans 6, 7 and 8, respectively. The chambers 20 and 21 are separated by a partition wall 23, and chambers 21 and 22 by a partition wall 24. The top wall of each chamber consists of a ceiling member 25 and an insulating element 26, such as ashes or sand.

One of the features of my invention is the provision of means to control the temperature of the heat in the distilling chambers. To accomplish this result, I provide means to introduce cold air, under pressure, into the radiators 15, to cool them off or to lower the temperature of the gases therein contained during the operation of the device. The means above referred to consists (in this instance) of a manifold duct 28 connected to an air supplying device (not shown). As can be seen in Fig. 5 there is a manifold 27 for each distilling chamber containing pans 7 and 8 and a manifold 29 for the chamber containing pan 6, it being understood that manifold 29 is suitably connected to the air supplying device. Each manifold has leading therefrom nozzles 30 which lead into the radiators, there being a nozzle for each radiator passing through the end wall thereof, as can be seen in Fig. 2. Each manifold includes a controlling valve 31 by which means the introduction of cold air into the radiators is controlled.

Referring to the construction of the distilling chambers, they are isolated one from the other, as has been stated. Each pan 6, 7 and 8 is spaced from the side walls 32, top wall 25, and bottom 32 of said chambers to provide passages for the circulation of the heated air, the passage above the pans consisting of acid proof pipes 33 extending from and through the end walls 33ª of each pan. The liquid to be distilled lies within the pans and flows from one to the other, through the pipes 9 and 10 from the bottom 34 of one pan to the bottom of the other, the hereinbefore referred to gutters being formed in said bottom members 34. As can be seen in Fig. 2, the interior side wall 32 of each distilling chamber is insulated from the outside wall 35 by an air space 36. Each distilling pan is in this instance supported by piers 37 at one end thereof, and by cross channels 38 at the other end thereof.

The distilling apparatus which I will designate as an entirety by A (see Fig. 1) is employed in combination with a tower B for final concentration containing suitable condensing elements. As these towers are well known in the art of distillation of sulfuric acid, a detailed description thereof will be omitted. The tower B will be hereinafter referred to as a concentrating device. Each pan 7 and 8 is connected to the concentrating tower B by ducts 39 and 40, respectively. The first pan 6 is not connected to tower B, as the evaporated matter produced within same is of such low grade that it is of little use for further distillation without having been again subjected to treatment in the Glover tower (not shown). To sum up, the gases produced in the first chamber may be conducted therefrom into a condenser and from there back into the Glover tower for retreatment, or the said condensed gases may be otherwise disposed of. The device operates as follows:—In combination with the elements already described, I employ a Glover tower, which is not shown, but which is well known for the production of sulfuric acid. The liquid produced in the Glover tower is introduced into the first chamber into the pan 6. The chamber is heated to about 250 degrees Fahrenheit. The liquid on pan 6 will be evaporated, or rather that part thereof which will be evaporated by this comparatively low temperature. The gases generated in chamber 6 will be disposed of as above referred to; the unevaporated liquid will be conducted through pipe 9, at a suitable time, and into pan 7. The temperature of the second chamber will be about 450 degrees Fahrenheit or higher than in the first chamber. The relatively higher temperature will evaporate the liquid therein contained still further than was accomplished in the first pan. The gases generated in this second pan will be conducted therefrom, through duct 39 to and through a condenser (not shown) from which the resulting liquid, which will be weak acid, will be pumped into the top of the concentrating tower B. The liquid pumped into the top of tower B will flow by gravity through the tower B to meet and mingle with the stronger acid fumes introduced into the bottom of tower B from the last chamber or pan 8. The liquid which will not be evaporated by the temperature in the second chamber will be conducted to the last chamber of pan 8, through pipe 10. The temperature of pan 8 will be about 600 degrees or relatively high. The gases generated in the last chamber will be conducted, as has been briefly referred to, through pipe 40 to the bottom of tower B. As has been stated, weak acid, in liquid form, will gravitate through tower B, while the gases introduced into the bottom of the tower will rise and be condensed. The final action takes place in tower B, said action being the mingling of the weak acid and the stronger acid, resulting in a concentrate of about 93 to 94 per cent. The purpose of the ducts produced by the employment of the acid-proof pipes 33 is to prevent condensation at the top of the chambers. The hot air passing through pipes 33 will maintain them at sufficient temperature to prevent condensation. It will be evident that I accomplish the distillation of the liquid generated in the Glover tower step by step by subjecting the same to a relatively low temperature, then to a somewhat higher temperature, and finally to a relatively high temperature, the whole process being accomplished by air heated by the conductivity of radiators, which are in turn heated. It will be also evident that the condensing chambers are isolated from the gases of combustion, and hence the chances of crystallization are avoided.

Having described my invention, what I claim is:—

1. In a distilling device, a distilling chamber, a duct for the passage of hot gases adjacent thereto but out of communication therewith, and radiating devices arranged to absorb heat from the hot gases in said passage extending into the distilling chamber.

2. In a distilling device, a distilling chamber, a duct for the passage of hot gases adjacent thereto, but out of communication therewith, radiating devices arranged to absorb heat from the hot gases in said passage extending into the distilling chamber, said radiators consisting of hollow chambers open at one end, the open end of each chamber being located in the path of flow of the hot gases through said passage.

3. In a distilling device, a chamber, a pan within the chamber, spaced from the walls thereof to provide passages for the circulation of heated air, a passage for hot gases adjacent the chamber but out of communication therewith, and radiating devices to conduct heat from the gases in said passage to the air in said chamber, the radiating devices extending into said chamber.

4. In a distilling device, a chamber, a pan within the chamber, spaced from the walls thereof to provide passages for the circulation of heated air, a passage for hot gases adjacent the chamber but out of communication therewith, radiating devices to conduct heat from the gases in said passage to the air in said chamber, and means to introduce cold air into said radiators.

5. In a distilling apparatus, a series of closed chambers, an evaporating pan in each chamber, a pipe connecting the pan of one chamber with the pan of an adjacent chamber, a passage for hot gases adjacent said chambers but out of communication therewith, and heat radiators extending from said passages into their respective chambers.

6. In a distilling apparatus, a series of closed chambers, an evaporating pan in each chamber, a pipe connecting the pan of one chamber with the pan of an adjacent chamber, a passage for hot gases adjacent said chambers but out of communication therewith, heat radiators extending from said passages into their respective chambers, a cold air supply, and means to introduce cold air into said radiators.

7. In a distilling device, a chamber, heating means, adjacent thereto, but out of communication therewith, hollow radiating devices arranged to be heated by the heating means, said radiators extending into said chamber, and means to introduce cold air into said hollow radiators.

8. In a distilling apparatus, a plurality of independent evaporating chambers, a heating means common to all of said chambers but out of communication with any of said chambers, independently acting radiating devices for each chamber, arranged to be heated by said heating device and means to control the temperature of said radiating devices.

9. In a distilling device, a closed chamber, a closed evaporating pan in said chamber having a duct for the escape of gases generated in said pan, said pan being spaced from the side walls and bottom of said chamber to provide a passage for the circulation of heated air, a radiating device extending into said chamber, means out of communication with the chamber to heat the radiating device, and means to apply a cooling medium to said radiating device.

Signed at New York city, N. Y., this 6 day of March, 1919.

HENRY JANDER.

Witnesses:
MAURICE BLOCK,
EDWARD A. JARVIS.